United States Patent
Baccetti

[11] 3,722,034
[45] Mar. 27, 1973

[54] CUT-OFF DEVICE FOR FORMING APPARATUS

[75] Inventor: Valerio A. Baccetti, San Leandro, Calif.

[73] Assignee: Armour and Company, Chicago, Ill.

[22] Filed: Nov. 9, 1970

[21] Appl. No.: 87,937

[52] U.S. Cl. ........................................... 17/32, 17/41
[51] Int. Cl. .................................................. A22c 7/00
[58] Field of Search ........................... 17/32, 35, 41

[56] References Cited

UNITED STATES PATENTS

| | | | |
|---|---|---|---|
| 2,795,816 | 6/1957 | Spang et al. | 17/32 |
| 1,881,171 | 10/1932 | Cooley | 17/32 X |
| 2,539,232 | 1/1951 | Dempster | 17/32 X |
| 3,158,895 | 12/1964 | Hilgeland | 17/32 |

*Primary Examiner*—Lucie H. Laudenslager
*Attorney*—Carl C. Batz

[57] ABSTRACT

In the forming or extrusion of comminuted material products, such as meat loaf products, through a forming or extruder horn onto a receiving surface, such as a conveyor, a knife is supported for movement adjacent the horn outlet and between the horn and receiving surface for severing the formed or extruded material. If the forming or extruding apparatus is operated intermittently, the knife is automatically actuated in response to the stopping of the former or extruder.

14 Claims, 10 Drawing Figures

PATENTED MAR 27 1973 3,722,034

INVENTOR
Valerio A. Baccetti

BY Carl C. Batz

ATTY.

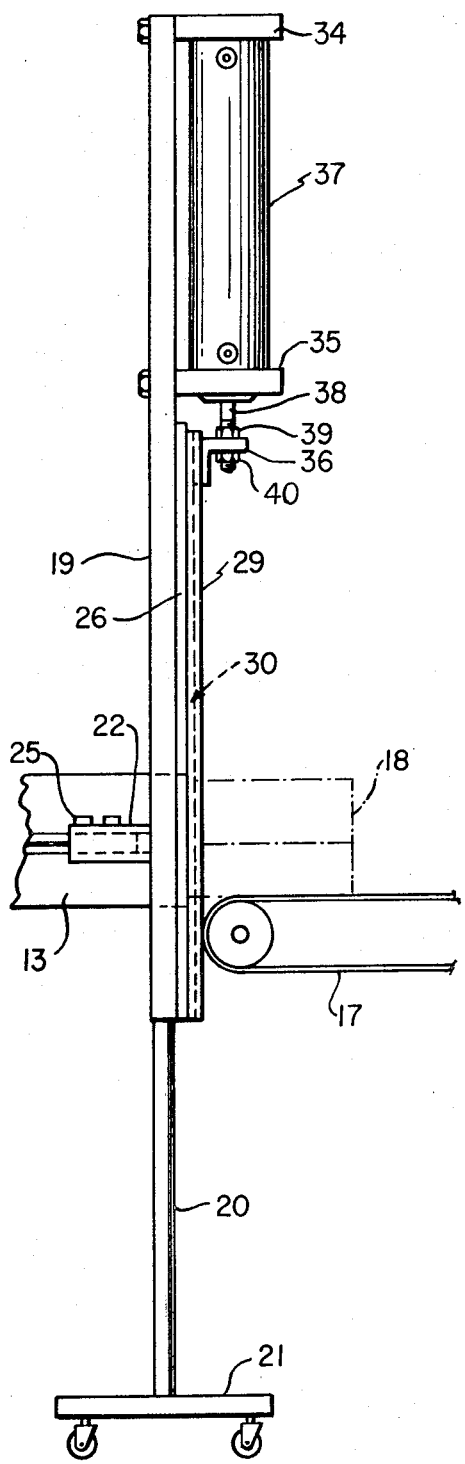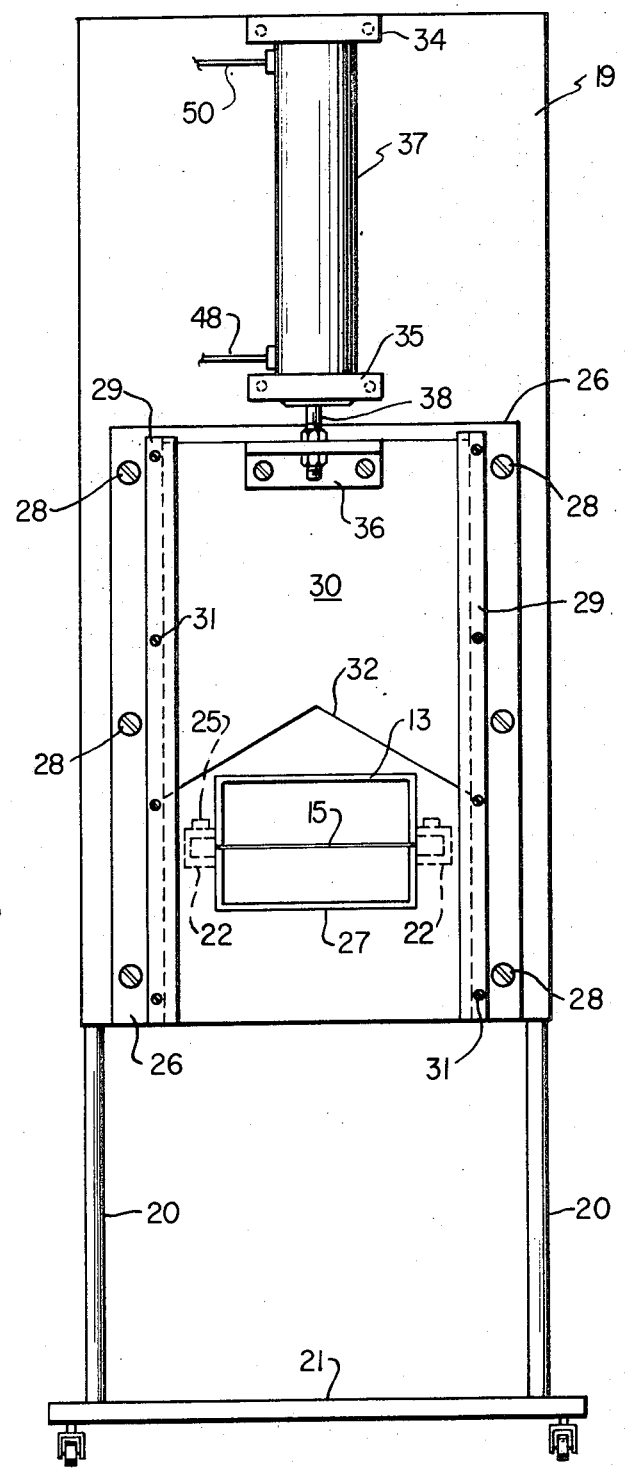
FIG. 2
FIG. 3
INVENTOR
Valerio A. Baccetti
BY Carl C. Batz
AT

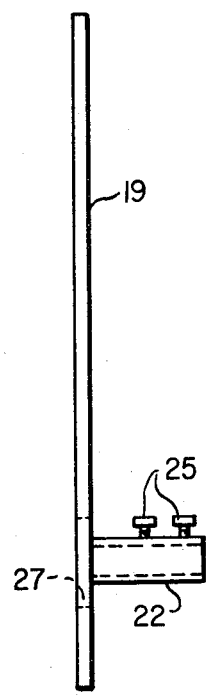
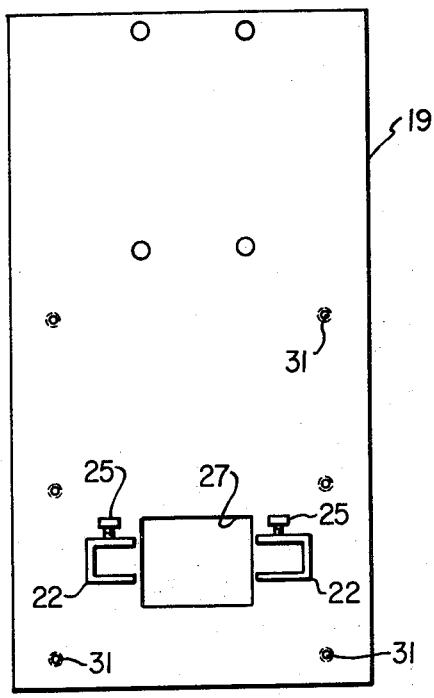
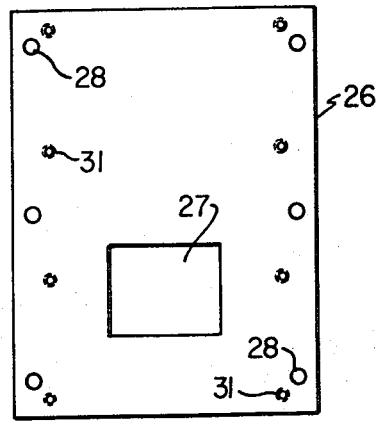
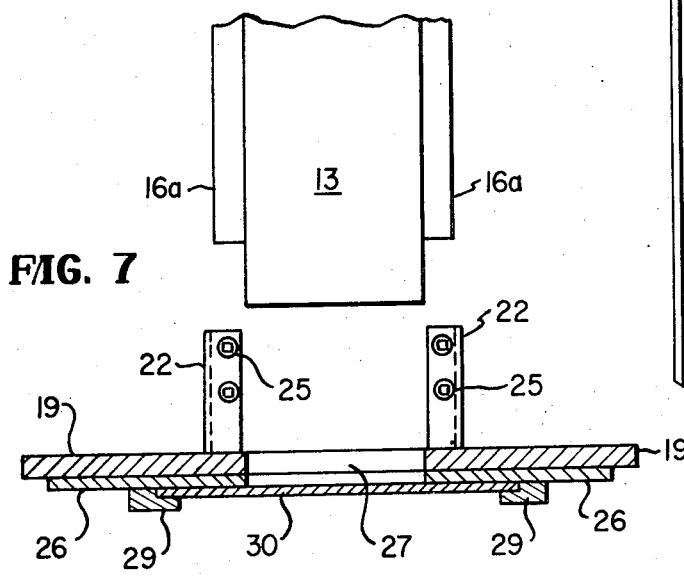
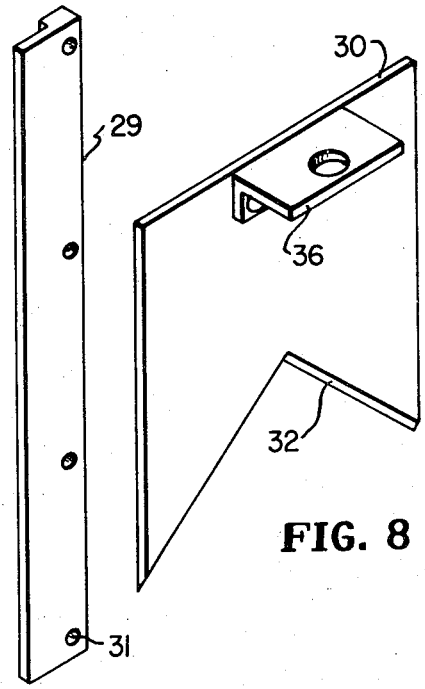

3,722,034

CUT-OFF DEVICE FOR FORMING APPARATUS

BACKGROUND AND SUMMARY

The severing of formed or extruded materials, such as meat loaf material, has long presented a problem because of the tendency of the material to break up during the cutting operation. This is especially true in the case of extruding a poultry loaf consisting of meat pieces united by myosin or other adhesive material. In manual cut-off operations, not only is the cutting tedious and difficult but also there is the tendency of the knife to wander from a truly vertical path, resulting in unequal loaves and loss of material. In the typical meat loaf, there is an upper white meat section and a lower dark meat section, with the sections joined together at an intermediate line of division, and since the materials have different resistances to cutting, the problem of severing the combined sections is increased. Further, such manual operations require additional personnel and considerable time in production operations. Up to the present time, automatic mechanical devices of various types for cutting off the extruded loaf have been unsuccessful for a number of reasons.

I have discovered that it is possible to cut off the extruded loaf accurately and in greatly reduced time by providing knife structure which is guided in a true path along the face or edge of the extruder horn and with the knife operated in synchronism with the extruding apparatus. For example, when the extruder is operated intermittently, I provide cut-off means responsive to the stopping of the extruder for effecting the severing of the loaf during the delay interval. While any knife structure may be employed, I prefer to use a knife with an inverted V cutting edge which cuts from the outside in.

DRAWINGS

In the accompanying drawings,

FIG. 1 is a broken perspective view of extruding and conveying apparatus in combination with cut-off mechanism embodying my invention;

FIG. 2, a broken side view in elevation of the cut-off mechanism;

FIG. 3 a front view in elevation of the plate structure and cut-off means carried thereby;

FIG. 4, a detail side view in elevation of the support plate equipped with means for mounting an extruder horn thereon;

FIG. 5, a rear view of the structure shown in FIG. 4;

FIG. 6, a detail front view of the knife back support;

FIG. 7, a broken top plan view of the plate and knife structure showing the horn in position for attachment to the plate;

FIG. 8, a perspective view of the knife and

FIG. 9, a schematic view showing the wiring layout control mechanism employed for the operation of the knife in synchronism with the extruder mechanism; and FIG. 10, a front view in elevation of a heat-treated metal plate adapted to lie against the front portion of the support plate.

DETAILED DESCRIPTION

The forming or extruding apparatus may be of any suitable type or construction. In Posegate U.S. Pats. No. 3,530,531 and No. 3,416,931 there is shown and described an extruder for the forming of poultry meat loaf with white and dark meat combined in separate layers. My cut-off device may be employed effectively in the severing of such extruded molded products and in timed relation with the extruding mechanism. However, it will be understood that the cut-off device may be employed with other forms of extruders or forming apparatus.

White pieces of poultry meat and dark pieces of poultry meat are separately agitated in the presence of salt to produce upon the meat surfaces a sticky coating of salt-soluble protein (myosin), and the pieces are forced separately by extruders into a horn divided at an intermediate point by a divider plate, and the white pieces of meat are forced through one side of the horn and dark meat pieces through the other side so that when they come together near the outlet of the horn, the two layers are combined in a unified loaf. If desired, the divider plate can be removed and a single kind of poultry meat extruded or a mixed combination extruded. The apparatus for producing such products is shown in said above-identified patents and in FIG. 1 hereof, and such known apparatus has means for stopping the operation of the extruder after a certain amount of meat has been extruded. In other words, there is a control means provided in the machine for stopping the machine after the extrusion of a given volume of meat.

Figure 1:
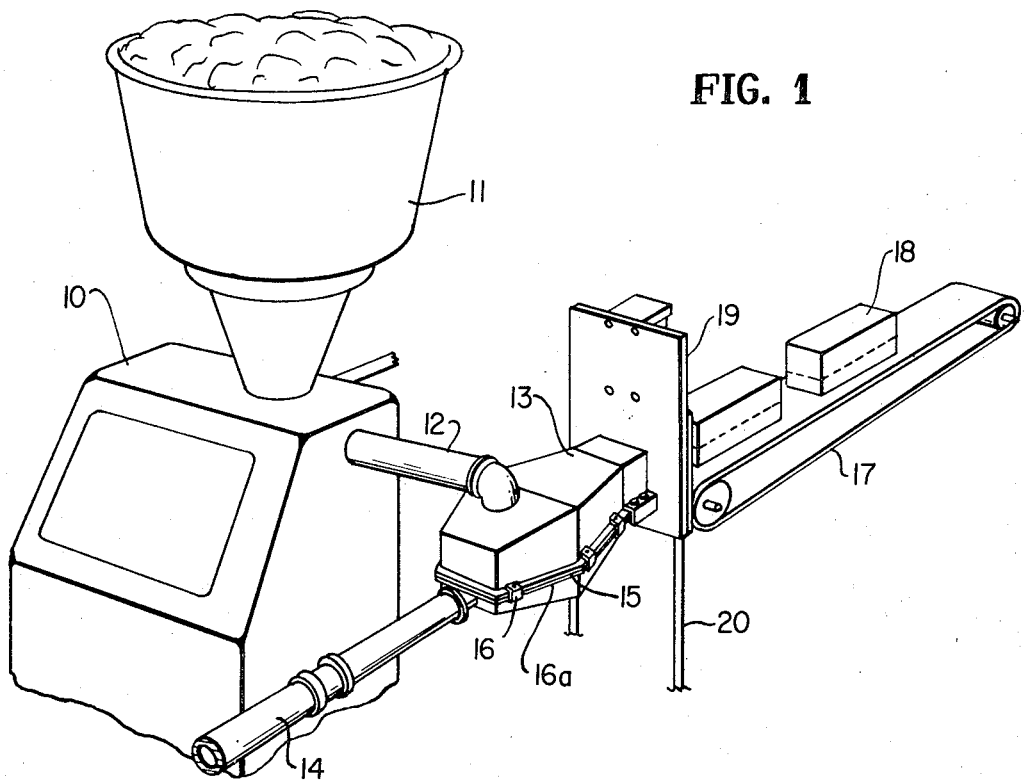

Referring to FIG. 1, an extruder 10 receives meat pieces covered with salt-soluble protein from a hopper 11 thereabove and discharges the meat pieces through a conduit 12 into the top or back of an extruder horn 13. Preferably the white poultry meat pieces are discharged into the upper portion of the divided horn 13. A similar extruder may receive dark poultry meat pieces, as shown in FIG. 1, and such pieces may be discharged through conduit 14 into the rear of the lower compartment of the extruder horn 13. A divider plate 15 extends across the horn at an intermediate point to divide it into compartments, and clamps 16 are provided for securing the side flanges 16a of the horn 13 together in sealing relation with the edges of the divider plate 15. Since the extruder structure is well known, a further detailed description is believed unnecessary.

The meat may be extruded upon any receiving surface but preferably is discharged upon an endless conveyor 17 which is driven at the same speed as the discharged product. Upon the conveyor 17 is shown the loaf product 18 which has upper and lower layers of meat, as described above.

My cut-off apparatus is shown interposed between the outer end of the extruder horn 13 and the conveyor 17 and it preferably comprises a generally vertical plate 19 mounted upon supports 20 carried by a roller-equipped platform 21. The plate 19 is provided with an aperture 27, and on its rear side is provided with U-shaped flanges 22 for receiving the side flanges 16a. As shown best in FIG. 7, the forward portion of flanges 16a is cut away, and as the horn is advanced into the opening 27 of plate 19, the side flanges 16a are received within the plate U-shaped flanges 23 and are secured therein by clamping screws 25.

Mounted on the front of plate 19 is a heat-treated metal plate 26 provided with an aperture 27 aligned with the plate aperture 27 in plate 19, and the plate 26 is secured to plate 19 by screws 28. The plate 26 has anchored thereto guide bars 29, as shown best in FIGS. 2, 3 and 8, so as to provide guideways for the knife 30, the guide bars being secured to plate 26 by screws 31.

The knife 30 may be of any suitable type or construction. I prefer a knife which has a cutting edge 32 in the shape of an inverted V so that in the cutting operation the cutting is from the outside in. Any suitable means for operating the knife 30 may be employed. In the illustration given, I provide an air cylinder 37 secured at its top and bottom to the plate 19 by brackets 34 and 35. As shown best in FIGS. 2 and 3, the knife is provided with an angle iron bracket 36 to which is releasably secured the piston rod 38 of the air cylinder 37, the rod 38 being threaded and the threaded end extended through an aperture in the bracket 36 and anchored therein by nuts 39 and 40. Thus, the knife can be readily disconnected for cleaning, etc.

Figure 9:
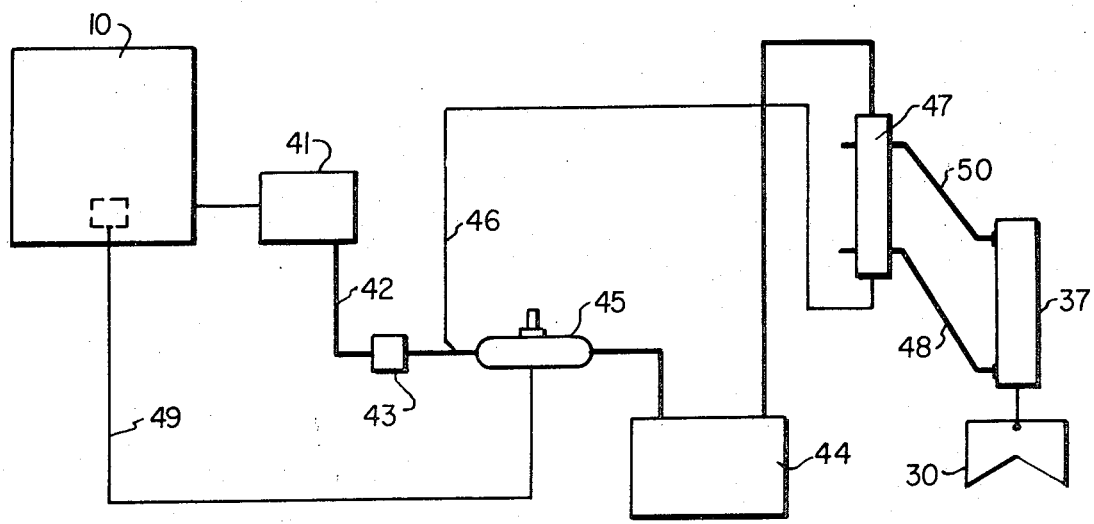

The operation of the apparatus can best be described from the schematic showing in FIG. 9 in which 10 designates the extruder machine and 41 designates a clutch which is employed for stopping or starting the extruder cycle. The clutch 41 is operated by compressed air through line 42 which may be provided with a flow control 43, the flow of air to the clutch 41 being from a source 44 of air pressure and the air passing through line 42 which is controlled by an electric solenoid valve 45. When the valve is raised, air flows from the source 44 through the valve control 43 and line 42 to the clutch 41 to close the clutch and start the cycle. At the same time, compressed air flows from source 44 through valve 45 and conduit 46 through the air-operated solenoid valve 47 which opens the lower conduit 48 connected to the lower part of the piston 37 to raise the knife 30. In this operation, the restricter or flow control 43 is effective in slowing the flow through line 42 to the clutch 41 to permit quick flow through line 46 to the valve 47. This makes sure that the knife is in raised position before the clutch is engaged.

After the extruder 10 has extruded the selected amount of product, the electronic control above mentioned as a part of the known extruder 10 sends an electric signal through line 49 to the solenoid valve 45 to close the valve and release the pressure in the clutch system 41 and invert the cycle on the controlled air solenoid valve 47, whereupon the air pressure is now open to line 50 so that air enters the top of the piston cylinder 37 to force the knife downwardly in the cutting operation. The clutch 41 is in disconnect position and the extruder has reached the end of the cycle.

If desired, a timer may be employed to restart the cycle or the operator may be equipped with a foot switch or other means for restarting the cycle so as to operate control solenoid valve 45 to open conduit 42. The operation described above may then be repeated.

Instead of employing the control mechanism shown in FIG. 9, it will be understood that electronic switch and actuating means may be substituted to give the timed operation of the knife during the interval in which the extruder 10 stops its operation momentarily.

It is important that the knife at the end of the cycle be in its lowered position where it serves the function of closing the extruder horn and thus allowing the meat to be contacted evenly against the knife so that in the subsequent cutting operation exact amounts of meat loaf will be produced and the loaf will have a square front end.

By having the knife guided so that it moves constantly in close contact with the end of the horn, the meat is supported during the cutting operation without tendency for the meat pieces to break or fall away, and each loaf has a true vertical front and rear side.

At the beginning of the operation, there are several cycles of operation, with the knife opening and closing without cutting any product because the product has not traveled through the conduits and horn to reach the knife, and the product from the second machine through conduit 14 will reach the knife still later. When both products reach the knife, the knife in lower position serves as a temporary closure under the existing pressure in the system to square the front surface of the loaf.

While in the foregoing specification I have set out specific structure in considerable detail for the purpose of illustrating an embodiment of the invention, it will be understood that such details may be varied widely by those skilled in the art without departing from the spirit of my invention.

I claim:

1. In combination with extruder apparatus for extruding meat from an extruder horn, a knife adjacent the outlet of said horn and movable to a position across the outlet of said horn to sever the extruded meat and block passage of meat from said horn, extrusion control means for stopping the operation of said apparatus, and knife control means associated with said extrusion control means for moving said knife to said position at a time prior to the stoppage of operation of said extrusion apparatus by said extrusion control means whereby to square the severed end of the meat being extruded.

2. A device as set forth in claim 1 including means for starting said extruder apparatus in operation, and means associated with said starting means for moving said knife from said position across said horn outlet at a time prior to the starting of said apparatus by said starting means.

3. A device as set forth in claim 2 wherein said stopping means and said starting means operate intermittently to thereby extrude successive lengths of meat in loaf form.

4. A device as set forth in claim 1 including a conveyor spaced from said horn onto which the extruded meat is discharged, said knife being disposed in said space.

5. A device as set forth in claim 4 including a vertical plate in said space, said plate having an opening for receiving the outlet end of said horn.

6. A device as set forth in claim 5 wherein said plate is provided with parallel guide rails for receiving and guiding said knife for movement across said opening.

7. A device as set forth in claim 5 wherein said knife has an off-set bracket and knife control means includes a cylinder mounted on said plate having a piston rod connected to said bracket.

8. The structure of claim 1 wherein said stopping means includes a clutch which when disengaged stops said extrusion apparatus.

9. The structure of claim 1 wherein said stopping means includes a control device for delaying the stopping of said apparatus until after the operation of said knife by said knife control means.

10. The structure of claim 9 wherein said control device for delaying stopping is a valve for limiting air flow.

11. In combination with extruder apparatus for extruding meat from an extruder horn, a knife adjacent the outlet of said horn and movable to a position across the outlet of said horn to sever the extruded meat, extrusion control means for starting said extruder apparatus in operation, and means associated with said starting means for moving said knife from said position across said horn outlet at a time prior to the starting of said apparatus by said starting means.

12. The structure of claim 11 wherein said starting means includes a clutch which when engaged, starts said extrusion apparatus.

13. The structure of claim 11 wherein said starting means includes a control device for delaying the starting of said apparatus until after the moving of said knife from said position by said associated means.

14. The structure of claim 13 wherein said device for delaying said starting is a valve for limiting air flow.

* * * * *